US012793261B2

(12) United States Patent
Seipp et al.

(10) Patent No.: US 12,793,261 B2
(45) Date of Patent: Nov. 10, 2026

(54) SIGNALING DEVIATIONS IN USER POSITION DURING A VIDEO CONFERENCE

(71) Applicant: Google LLC, Mountain View, CA (US)

(72) Inventors: Karsten Seipp, East Harling (GB); Anton Volkov, Seattle, WA (US)

(73) Assignee: Google LLC, Mountain View, CA (US)

( * ) Notice: Subject to any disclaimer, the term of this patent is extended or adjusted under 35 U.S.C. 154(b) by 214 days.

(21) Appl. No.: 18/197,709

(22) Filed: May 15, 2023

(65) Prior Publication Data

US 2024/0386604 A1 Nov. 21, 2024

(51) Int. Cl.
*G06T 7/73* (2017.01)
*H04L 65/403* (2022.01)

(52) U.S. Cl.
CPC .............. *G06T 7/74* (2017.01); *H04L 65/403* (2013.01); *G06T 2200/24* (2013.01); *G06T 2207/10016* (2013.01); *G06T 2207/30201* (2013.01)

(58) Field of Classification Search
CPC ................... G06T 7/74; G06T 2200/24; G06T 2207/10016; G06T 2207/30201; H04L 65/403; H04N 7/152; H04N 7/147
See application file for complete search history.

(56) References Cited

U.S. PATENT DOCUMENTS 5,786,846 A 7/1998 Hiroaki
2010/0149310 A1 6/2010 Zhang et al.
2011/0096137 A1 4/2011 Baker et al.
2013/0147980 A1 6/2013 Gärdenfors et al.
2015/0248167 A1* 9/2015 Turbell ................ G06F 3/0481 715/754
2019/0320135 A1* 10/2019 Cutler .................... H04N 7/142
2019/0370532 A1 12/2019 Soni et al.
2023/0109787 A1* 4/2023 O'Leary ................ G06V 40/28 348/14.09

FOREIGN PATENT DOCUMENTS

WO 2022165147 A1 8/2022

OTHER PUBLICATIONS

International Search Report and Written Opinion for International Application No. PCT/US2024/028954, mailed Aug. 6, 2024, 20 pages.

* cited by examiner

*Primary Examiner* — Phung-Hoang J Nguyen
(74) *Attorney, Agent, or Firm* — Lowenstein Sandler LLP

(57) ABSTRACT

Systems and methods for signaling deviations in a user position during a video conference are provided. A reference position of a user within a field of view (FOV) of a camera associated with a client device is determined. The user is one of a plurality of participants of a video conference. A video stream generated by the camera associated with the client device is then received. The video stream comprises an image of the user of the client device. From the image, a current position of the user within the FOV is determined. Responsive to determining that a value of a metric reflecting a deviation of the current position from the reference position satisfies a threshold criterion, an alert to the user is generated.

15 Claims, 7 Drawing Sheets

SIGNALING DEVIATIONS IN USER POSITION DURING A VIDEO CONFERENCE

TECHNICAL FIELD

Aspects and implementations of the present disclosure relate to signaling deviations in user position during a video conference.

BACKGROUND

Video conferences can take place between multiple participants via a video conference platform. A video conference platform includes tools that allow multiple client devices to be connected over a network and share each other's audio (e.g., voice of a user recorded via a microphone of a client device) and/or video stream (e.g., a video captured by a camera of a client device, or video captured from a screen image of the client device) for efficient communication. To this end, the video conference platform can provide a user interface that includes multiple regions to display the video stream of each participating client device.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes determining a reference position of a user within a field of view (FOV) associated with a camera of a client device. The user is one of a plurality of participants of a video conference. The method further includes receiving a video stream generated by the camera associated with the client device, the video stream comprising an image of the user of a client device. The method further includes determining, from the image, a current position of the user within the FOV. Responsive to determining that a value of a metric reflecting a deviation of the current position from the reference position satisfies a threshold criterion, an alert to the user is generated.

A further aspect of the disclosure provides a system comprising: a memory; and a processing device, coupled to the memory, the processing device to perform a method according to any aspect or implementation described herein.

A further aspect of the disclosure provides a non-transitory computer-readable medium comprising instructions that, responsive to execution by a processing device, cause the processing device to perform operations according to any aspect or implementation described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
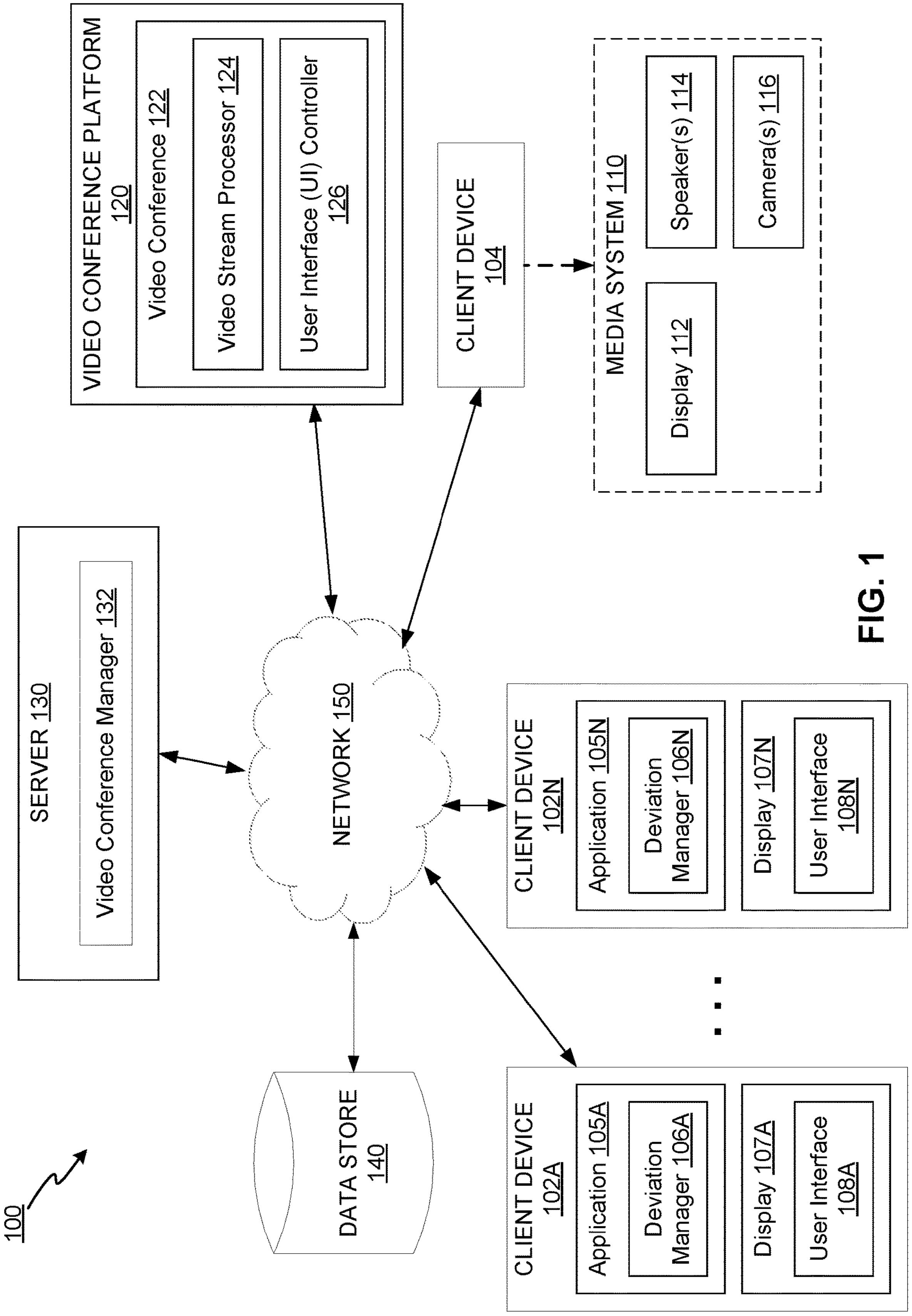
FIG. 1 illustrates an example system architecture, in accordance with implementations of the present disclosure.

Aspects of the present disclosure relate to signaling deviations in user position during a video conference. A video conference platform can enable video-based conferences between multiple participants via respective client devices that are connected over a network and share each other's audio (e.g., voice of a user recorded via a microphone of a client device) and/or video streams (e.g., a video captured by a camera of a client device) during a video conference. In some instances, a video conference platform can enable a significant number of client devices (e.g., up to one hundred or more client devices) to be connected via the video conference.

A participant of a video conference can speak (e.g., present on a topic) to the other participants of the video conference. Some existing video conference platforms can provide a user interface (UI) to each client device connected to the video conference, where the UI displays the video streams shared over the network in a set of regions in the UI. For example, the video stream of a participant who is speaking to the other participants in the video conference can be displayed in a designated region in the UI of the video conference platform. In some instances, one or more of the participants can be poorly framed in their respective designated regions. For example, a participant's camera can be mounted at a high elevation, thus giving the participant in the video frame excess headspace, the participant can be positioned too close to the camera, resulting in them being cut off at the top or sides, and so forth.

Further, current video conference platforms are typically unable to align eye lines and scale the size of the participants to a common value, contrary to face-to-face meetings, in which participants' eyelines and body size usually match up. The mismatch present in current video conference platforms generates an unrealistic visual display that causes a participant to jump between rows of differently sized and misaligned faces, resulting in meeting fatigue due to frequent eye movement and increasing cognitive load, thereby devaluing the quality of the user experience.

Some systems can use auto-framing to handle the above discussed issues. However, auto-framing can generate a queasy or sea-sick like feeling in a participant(s) due to the constant movement of the auto-framed individual. Auto-framing can also result in the unnecessary consumption of computing resources, thereby decreasing overall efficiency and increasing overall latency of the video conference platform.

Implementations of the present disclosure address the above and other deficiencies by detecting deviations of a participant of a video conference from an optimal position and generating alerts that indicate such deviations. In particular, a video conference application can provide, for presentation on a client device, a call set-up room UI. The call set-up room (or green room) UI can provide a user of the video conference application with tools to set their conference related preferences prior to joining or starting the video conference. For example, the call-setup room UI can allow the user to select which camera to use (or to disable the camera), which speaker to use, whether to route the audio through another client device, etc.

In some implementations of the present disclosure, the call set-up room UI can detect and track the user's presence and (e.g., movements made by the user) using one or more software-based detection methods (e.g., image recognition techniques, machine-vision techniques, facial recognition techniques, box detection algorithms, etc.) or hardware-based detection methods (e.g., motion detection techniques, infrared techniques, ultrasound techniques, pinging techniques, audio triangulation techniques, etc.). The video conference application can then determine a "best-frame position" to display the user. The best-frame position of the user can be a position determined to facilitate the aligning of the user's eye line and profile size with the other participants of the video conference. The best-frame position of the user can be defined by a set of offsets of the user profile from the borders of the camera's field of view (FOV). For example, the best-frame position can include the user profile being centered within the borders such that a certain percentage (e.g., approximately 25%) of the background is visible to the left of the user profile and to the right of the user profile, and a certain percentage (e.g., approximately 10%) of the background is visible above the user profile, etc. The video conference application can then adjust the position or location of the user profile for display in the user's designated region on a video conference user interface (UI) such that the user profile is displayed in this best-frame position. Adjusting the position can include moving, scaling, rotating, cropping, zooming, or performing other adjustment operations to position the user profile in the best-frame position.

Upon the user joining the video conference, the application can track current positions of the user and generate a deviation alert in response to detecting that the user moves outside of the best-frame position (or moves outside of the best-frame position by a certain offset percentage). A deviation alert can include one or more visual cues, audible signals, or other signals such as a vibration. The deviation alert can suggest a corrective body movement for the user to perform. In an illustrative example, in response to an indication that the user is leaning outside of the best-frame position on the left side, the application can generate a visual and/or audible alert (e.g., by displaying a visual overlay (e.g., a colored overlay) on the left side of the video conference interface, by generating an audible signal from the left speaker, etc.). This alert may only be seen or heard by the user, thus not disrupting the video conference or alerting other participants of the user's movements. In some implementations, the more the user leans, the higher the intensity of the visual and/or audible alert (e.g., the color is brighter, the overlay expands to more of the user interface, the intensity of the audible signal increases, etc.). Once the user returns to the best-frame position, the deviation alert is removed/stopped. In some implementations, in response to an indication that the user is deviating from the best-frame position for a certain time, the video conference application can generate a new best-frame position by adjusting the position of the user, as was performed during set-up in the set-up room. If the user moves outside of the new best-frame position, a deviation alert can be generated. By guiding users to stay within best-frame positions determined for them, optimal framing of the users can be achieved, providing a professional appearance and enabling naturalness when generating a grid of video conference participants on the screen. In particular, by having each participant to be optimally framed, eye lines and profile sizes of the participants can be aligned to a common value, resembling an appearance of a face-to-face meeting.

Aspects of the present disclosure provide technical advantages over previous solutions. Aspects of the present disclosure can provide an additional functionality to a video conference platform by providing tools that generate optimal framing and individual alerts to help video conference participants maintain the optimal framing. The functionality can enable maintaining or readjusting the optimal framing without using complex software, such as auto-framing, that can have health adverse features. This results in more efficient use of processing resources, thereby resulting in an increase of overall efficiency and a decrease in potential latency of the video conference platform. This also results in improved user experience by reducing fatigue and possible discomforts, while improving user participation.

FIG. 1 illustrates an example system architecture 100, in accordance with implementations of the present disclosure. System architecture 100 (also referred to as "system" herein) includes client devices 102A-102N, one or more client devices 104, video conference platform 120, server 130, and data store 140, each connected to network 150.

In some implementations, network 150 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 140 is a persistent storage that is capable of storing data as well as data structures to tag, organize, and index the data. A data item can include audio data and/or video stream data, in accordance with implementations described herein. Data store 140 can be hosted by one or more storage devices, such as main memory, magnetic or optical storage-based disks, tapes or hard drives, NAS, SAN, and so forth. In some implementations, data store 140 can be a network-attached file server, while in other implementations data store 140 can be some other type of persistent storage such as an object-oriented database, a relational database, and so forth, that can be hosted by video conference platform 120 or one or more different machines (e.g., the server 130) coupled to the video conference platform 120 via network 150. In some implementations, data store 140 can store portions of audio and video streams received from the client devices 102A-102N for the video conference platform 120. Moreover, the data store 140 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents can be shared with users of the client devices 102A-102N and/or concurrently editable by the users.

Video conference platform 120 can enable users of client devices 102A-102N and/or client device(s) 104 to connect with each other via a video conference (e.g., a video conference 122). A video conference refers to a real-time communication session such as a video conference call, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. Video conference platform 120 can allow a user to join and participate in a video conference call with other users of the platform. Implementations of the present disclosure can be implemented with any number of participants connecting via the video conference (e.g, up to one hundred or more).

In some implementations, video conference manager 122 includes video stream processor 124 and user interface (UI) controller 126. Video stream processor 124 can receive video streams from the client devices (e.g., from client devices 102A-102N and/or 104). Video stream processor 124 can determine visual items for presentation in the UI (e.g., the UIs 108-108N) during a video conference. Each visual item can correspond to a video stream from a client device (e.g, the video stream pertaining to one or more participants of the video conference). In some implementations, the video stream processor 124 can receive audio streams associated with the video streams from the client devices (e.g., from an audiovisual component of the client devices 102A-102N). Once the video stream processor has determined visual items for presentation in the UI, the video stream processor 124 can notify the UI controller 126 of the determined visual items. The visual items for presentation can be determined based on current speaker, current presenter, order of the participants joining the video conference, list of participants (e.g., alphabetical), etc.

UI controller 126 can provide the UI for a video conference. The UI can include multiple regions. Each region can display a video stream pertaining to one or more participant of the video conference. UI controller 126 can control which video stream is to be displayed by providing a command to the client devices that indicates which video stream is to be displayed in which region of the UI (along with the received video and audio streams being provided to the client devices). For example, in response to being notified of the determined visual items for presentation in the UI 108A-108N, UI controller 126 can transmit a command causing each determined visual item to be displayed in a region of the UI and/or rearranged in the UI.

Client devices 102A-102N can each include computing devices such as personal computers (PCs), laptops, mobile phones, smart phones, tablet computers, netbook computers, network-connected televisions, etc. In some implementations, client devices 102A-102N can also be referred to as "user devices." Each client device 102A-102N can include an audiovisual component that can generate audio and video data to be streamed to video conference platform 120. In some implementations, the audiovisual component can include a device (e.g., a microphone) to capture an audio signal representing speech of a user and generate audio data (e.g, an audio file or audio stream) based on the captured audio signal. The audiovisual component can include another device (e.g., a speaker) to output audio data to a user associated with a particular client device 102A-102N. In some implementations, the audiovisual component can also include an image capture device (e.g., a camera) to capture images and generate video data (e.g., a video stream) of the captured data of the captured images.

In some implementations, video conference platform 120 is coupled, via network 150, with one or more client devices 104 that are each associated with a physical conference or meeting room. Client device(s) 104 can include or be coupled to a media system 110 that can comprise one or more display devices 112, one or more speakers 114 and one or more cameras 116. Display device 112 can be, for example, a smart display or a non-smart display (e.g., a display that is not itself configured to connect to network 150). Users that are physically present in the room can use media system 110 rather than their own devices (e.g., client devices 102A-102N) to participate in a video conference, which can include other remote users. For example, the users in the room that participate in the video conference can control the display 112 to show a slide presentation or watch slide presentations of other participants. Sound and/or camera control can similarly be performed. Similar to client devices 102A-102N, client device(s) 104 can generate audio and video data to be streamed to video conference platform 120 (e.g., using one or more microphones, speakers 114 and cameras 116).

Each client device 102A-102N or 104 can include client application 105A-N, which can be a mobile application, a desktop application, a web browser, etc. In some implementations, client application 105A-N can present, on a display device 107-107N of client device 102A-102N, a user interface (UI) (e.g., a UI of the UIs 108A-108N) for users to access video conference platform 120. For example, a user of client device 102A can join and participate in a video conference via a UI 108A presented on the display device 107A by client application 105A. A user can also present a document to participants of the video conference via each of the UIs 108A-108N. Each of the UIs 108A-108N can include multiple regions to present visual items corresponding to video streams of the client devices 102A-102N provided to the server 130 for the video conference.

In some implementations, server 130 includes a video conference manager 132. Video conference manager 132 can be configured to manage a video conference between multiple users of video conference platform 120. In some implementations, video conference manager 132 can provide the UIs 108A-108N to each client device to enable users to watch and listen to each other during a video conference. Video conference manager 132 can also collect and provide data associated with the video conference to each participant of the video conference. In some implementations, video conference manager 132 can provide the UIs 108A-108N for presentation by client application 105A-N. For example, the UIs 108A-108N can be displayed on a display device 107A-107N by client application 105A-N executing on the operating system of the client device 102A-102N or the client device 104. In some implementations, the video conference manager 132 can determine visual items for presentation in the UI 108A-108N during a video conference. A visual item can refer to a UI element that occupies a particular region in the UI and is dedicated to presenting a video stream from a respective client device. Such a video stream can depict, for example, a user of the respective client device while the user is participating in the video conference (e.g., speaking, presenting, listening to other participants, watching other participants, etc., at particular moments during the video conference), a physical conference or meeting room (e.g., with one or more participants present), a document or media content (e.g., video content, one or more images, etc.) being presented during the video conference, etc.

In some implementations, application 105A-105N includes deviation manager 106A-106N. Deviation manager 106A-106N can be configured to generate a best-frame position for respective client device users participating in a video conference, and generate one or more alerts (deviation alerts) indicative of a user's deviation from the best-frame position. As discussed in more detail with respect to FIGS. 2 and 3, the best-frame position may be a predetermined position defined by a set of offsets of the participant from the borders of the camera view displayed. In some implementations, once a user deviates from the best-frame position, deviation manager 106A-106N can generate one or more deviation alerts. A deviation alert can include one or more visual cues, audible signals, or other signals (such as a vibration) indicative of the user deviating from the best-frame position. In some implementations, the deviation alert can suggest a corrective body movement for the user to perform by generating the deviation alert on the side of client device 102A-120N, 104 or UI 108A-108N corresponding with side that the user is deviating from the best-frame position. In some implementations, the alerts can be seen and/or heard only by the user. For example, if the alert is an audible signal (e.g., an alarm, a particular noise, a hum, etc.), deviation manager 106A-106N can generate the audible signal on the particular user's client device 102A and filter the alert from the microphone of the participant's client device, mute the microphone during the alert, etc. Deviation manager 106A-106N can also generate the audible signal using the speaker corresponding with the side that the user is deviating from the best-frame position (e.g., if the user is leaning to the left side of the conference interface, generating an audible speaker using the left speaker of or associated with the client device). In an example of a visual cue, deviation manager 106A-106N can generate a visual (e.g., colored) overlay on the side of the video conference interface (e.g., UI 108A-108N) towards where the user is deviating. In some implementations, the further the user deviates, the higher the intensity of the deviation alert (e.g, the color is brighter, the overlay expands to more of the user interface, the hum or noise is louder, the vibration is stronger, etc.). In some implementations, video conference manager 132 can include a deviation manager (not shown), which can operate instead of deviation manager 106A-N, or in conjunction with deviation manager 106A-N. Further details with respect to the best-frame position and deviation alerts are described below.

As described previously, an audiovisual component of each client device can capture images and generate video data (e.g., a video stream) of the captured data of the captured images. In some implementations, the client devices 102A-102N and/or client device(s) 104 can transmit the generated video stream to video conference manager 132. The audiovisual component of each client device can also capture an audio signal representing speech of a user and generate audio data (e.g., an audio file or audio stream) based on the captured audio signal. In some implementations, the client devices 102A-102N and/or client device(s) 104 can transmit the generated audio data to video conference manager 132.

In some implementations, video conference platform 120 and/or server 130 can be one or more computing devices computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to enable a user to connect with other users via a video conference. Video conference platform 120 can also include a website (e.g., a webpage) or application back-end software that can be used to enable a user to connect with other users via the video conference.

It should be noted that in some other implementations, the functions of server 130 and/or video conference platform 120 can be provided by a fewer number of machines. For example, in some implementations, server 130 can be integrated into a single machine, while in other implementations, server 130 can be integrated into multiple machines. In addition, in some implementations, server 130 can be integrated into video conference platform 120.

In general, functions described in implementations as being performed by video conference platform 120 and/or server 130 can also be performed by the client devices 102A-N and/or client device(s) 104 in other implementations, if appropriate. In addition, the functionality attributed to a particular component can be performed by different or multiple components operating together. Video conference platform 120 and/or server 130 can also be accessed as a service provided to other systems or devices through appropriate application programming interfaces, and thus is not limited to use in websites.

Although implementations of the disclosure are discussed in terms of video conference platform 120 and users of video conference platform 120 participating in a video conference, implementations can also be generally applied to any type of telephone call or conference call between users. Implementations of the disclosure are not limited to video conference platforms that provide video conference tools to users.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the video conference platform 120.

In situations in which the systems discussed here collect personal information about users, or can make use of personal information, the users can be provided with an opportunity to control whether video conference platform 120 collects user information (e.g., information about a user's social network, social actions or activities, profession, a user's preferences, or a user's current location), or to control whether and/or how to receive content from the server 130 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the video conference platform 120 and/or server 130.

Figure 2:
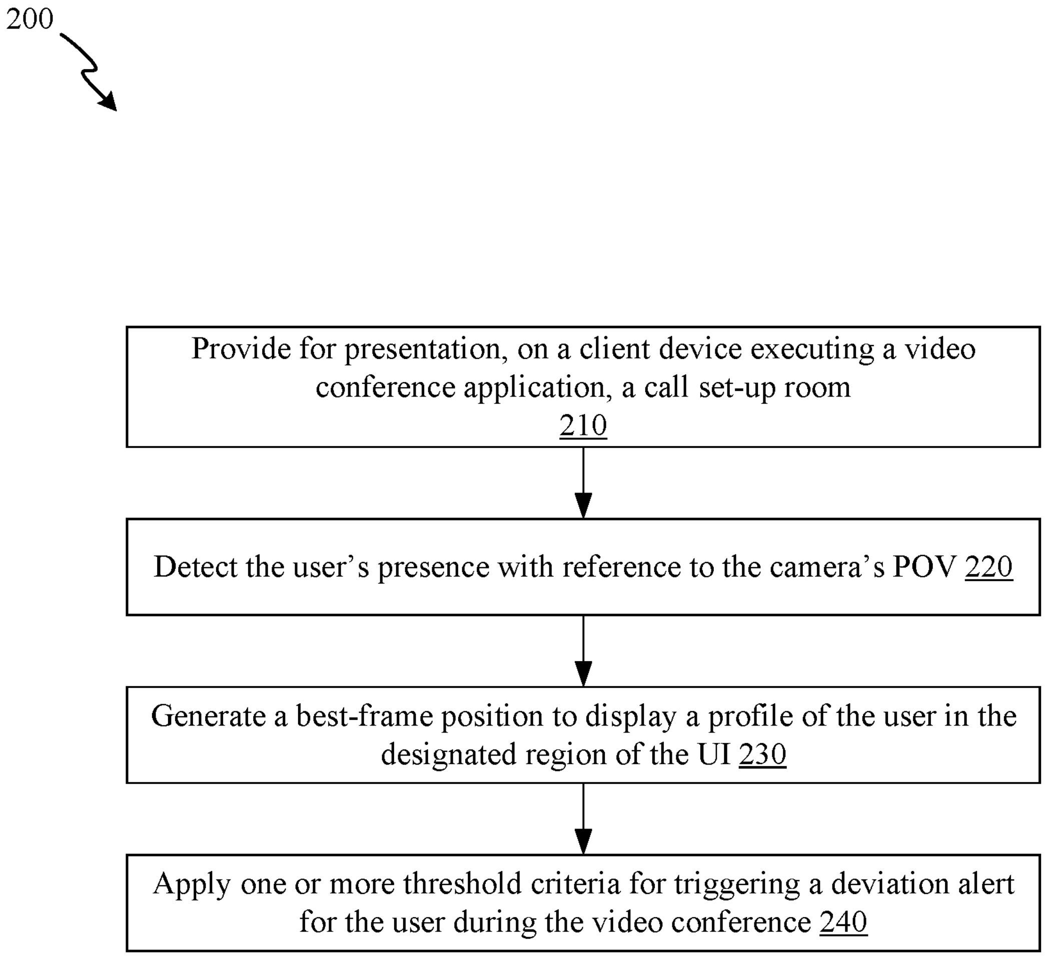
FIG. 2 depicts a flow diagram of a method for performing a setup of the best-frame position for a user of a video conference, in accordance with implementations of the present disclosure.

FIG. 2 depicts a flow diagram of a method 200 for performing a setup of the best-frame position for a user of a video conference, in accordance with implementations of the present disclosure. Method 200 can be performed by processing logic that can include hardware (circuitry, dedicated logic, etc.), software (e.g., instructions run on a processing device), or a combination thereof. In some implementations, some or all the operations of method 200 can be performed by one or more components of system 100 of FIG. 1 (e.g., client device 102A-102N, videoconference platform 120, and/or server 130).

For simplicity of explanation, the method 200 of this disclosure is depicted and described as a series of acts. However, acts in accordance with this disclosure can occur in various orders and/or concurrently, and with other acts not presented and described herein. Furthermore, not all illustrated acts can be required to implement the method 200 in accordance with the disclosed subject matter. In addition, those skilled in the art will understand and appreciate that the method 200 could alternatively be represented as a series of interrelated states via a state diagram or events. Additionally, it should be appreciated that the method 200 disclosed in this specification is capable of being stored on an article of manufacture (e.g., a computer program accessible from any computer-readable device or storage media) to facilitate transporting and transferring such a method to computing devices. The term "article of manufacture," as used herein, is intended to encompass a computer program accessible from any computer-readable device or storage media.

At operation 210, processing logic provides for presentation on a client device a call set-up room UI, which can be generated, for example, by a video conference client application and presented in a UI provided by the video conference application, or generated by a server of a video conference platform and presented via a web browser. In some implementations, the client device can be client device 102A-102N, 104 and the video conference application can be application 105A-N. In some implementations, the call set-up room UI can be presented in response to the user's request (e.g., by selecting a link or button) to join the video conference. For example, the user can receive a notification (e.g., a pop-up window) indicating that a video conference has begun or is scheduled to begin at a certain time. Responsive to the user selecting a button to access the video conference, processing logic can open the video conference application or a browser window and present the call set-up room UI.

At operation 220, processing logic detects the user's presence with reference to the POV of the client device's camera. In particular, the processing logic can obtain permission to access the camera of client device 102A-N, 104 and activate the camera. The processing logic can then use one or more software-based detection methods or hardware-based detection methods to detect the user's presence.

The software-based detection methods can detect the user's presence using, for example, image recognition techniques, machine-vision techniques, facial recognition techniques, box detection algorithms, and/or any other machine-learning based, algorithm-based, and/or software-based techniques. In an illustrative example, the processing logic can use image recognition software. Image recognition, in the context of machine vision, enables the video conference application to identify objects and/or people (e.g., the user) in digital images or video. The processing logic can use machine vision technologies in combination with the camera of client device 102A-N, 104 (e.g., camera 116) and a machine-learning model and/or artificial intelligence software to achieve image recognition.

In some implementations, the video conference application can use one or more hardware-based methods to detect the user's presence. The hardware-based methods can detect the user's presence using, for example, motion detection techniques, infrared techniques, ultrasound techniques, pinging techniques, audio triangulation techniques, etc. For example, the video conference application can use one or more hardware devices (e.g., an infrared camera, an ultrasound device, a speaker, etc.) operationally connected to client device 102A-N, 104 to detect the user's presence. For example, an ultrasound device can emit a signal and create an image based on the amplitude, frequency, and time it takes for the signal to return to a transducer of the ultrasound device. In some implementations, any combination of the software-based and hardware-based methods can be used to detect the user's presence.

In some implementations, once the user's presence is detected, the processing logic can identify a profile of the user. The processing logic can then track the motion of the user based on the profile. The user profile can be a predefined area associated with the user, such as a box, a rectangle, a circle, an oval, a free-form shape, etc. In an illustrative example, the profile can include a bounding box. A bounding box (or minimum bounding box) can be defined by coordinates of a rectangular border that enclose an object (in this case, the user) when placed over a background.

At operation 230, the processing logic generates a best-frame position to display a profile of the user in the designated region of the UI. In some implementations, the best-frame position (also referred to herein as a reference position) is defined by a set of offsets of the user profile from the borders of the camera's FOV. For example, the best-frame position can include the user profile being centered within the borders such that approximately 25% of the background is visible to the left of the user profile, approximately 25% of the background is visible to the right of the user profile, and approximately 10% of the background is visible above the user profile.

To generate the best-frame position, the processing logic can determine the frame generated by the FOV produced by the camera. For example, the processing logic can determine the dimensions (or coordinates) of the borders of the camera's FOV (e.g., the video frame or background). The processing logic can then calculate the proximity or distance of the user profile with respect to borders of the camera' FOV. For example, the processing logic can determine that the user profile is within x % offset from the left border, y % offset from the right border, z % offset from the top border, etc. The processing logic can then adjust the position of the user profile based on a predetermined best-frame position. To adjust the position, the processing logic can perform one or more adjustment operations to the user profile, such as moving, scaling, rotating, skewing offsetting, cropping, zooming, expanding, etc. In an illustrative example, the processing logic can center the user profile such that approximately 25% of the background is visible to the left and right of the user profile, and approximately 10% of the background is visible above the user profile.

At operation 240, processing logic applies one or more threshold criteria for triggering a deviation alert for the user during the video conference. A deviation alert can include one or more visual cues, audible signals, or other signals (e.g., a vibration) indicative of the user deviating from the best-frame position during the video conference. The deviation alert can suggest a corrective body movement to be performed by the user. The deviation alert can be triggered in response to determining that a value of a metric reflecting a deviation of the user's current position from the defined best-frame position satisfies a threshold criterion. In some implementations, the threshold criterion can include the user deviating from (moving outside of) the best-frame position by a certain offset percentage, by a certain pixel amount, based on a distance of one or more facial features identified within the image of the user from a vertical axis of the FOV of the camera, etc. The processing logic can detect facial features of the user in the image of the video stream generated by the camera. For example, the processing logic can use facial recognition to detect a number of facial features for each participant. Examples of facial features include the eyeline, the nose, the upper face region, the lower face region, the location of the mouth, and other such features. The upper face region can include, for example, the forehead, or an area surrounding the forehead. The lower face region can include, for example, the chin, or an area surrounding the chin.

In some implementations, applying the threshold criterion can include determining that the user has moved outside the best-frame position (e.g., by 5% if the width of the camera's FOV), which would then trigger the deviation alert. In some implementations, based on which side of the camera view the deviation occurred can determine on which side of the UI (or region) the deviation alert is triggered (e.g., if the user moves outside the best-frame position on the right side, the visual overlay can be triggered on the right side of the UI, the audible signal can be triggered using the right speaker, etc.). In some implementations, if the user comes too close to the camera, a deviation alert can be triggered (e.g., a colored overlay over the entire or a particular portion of the UI). In some implementations, the threshold criterion can include one or more threshold lines imposed on the display region. Responsive to the user position crossing one of the threshold lines, the threshold criterion is satisfied, triggering the deviation alert.

Figure 3:
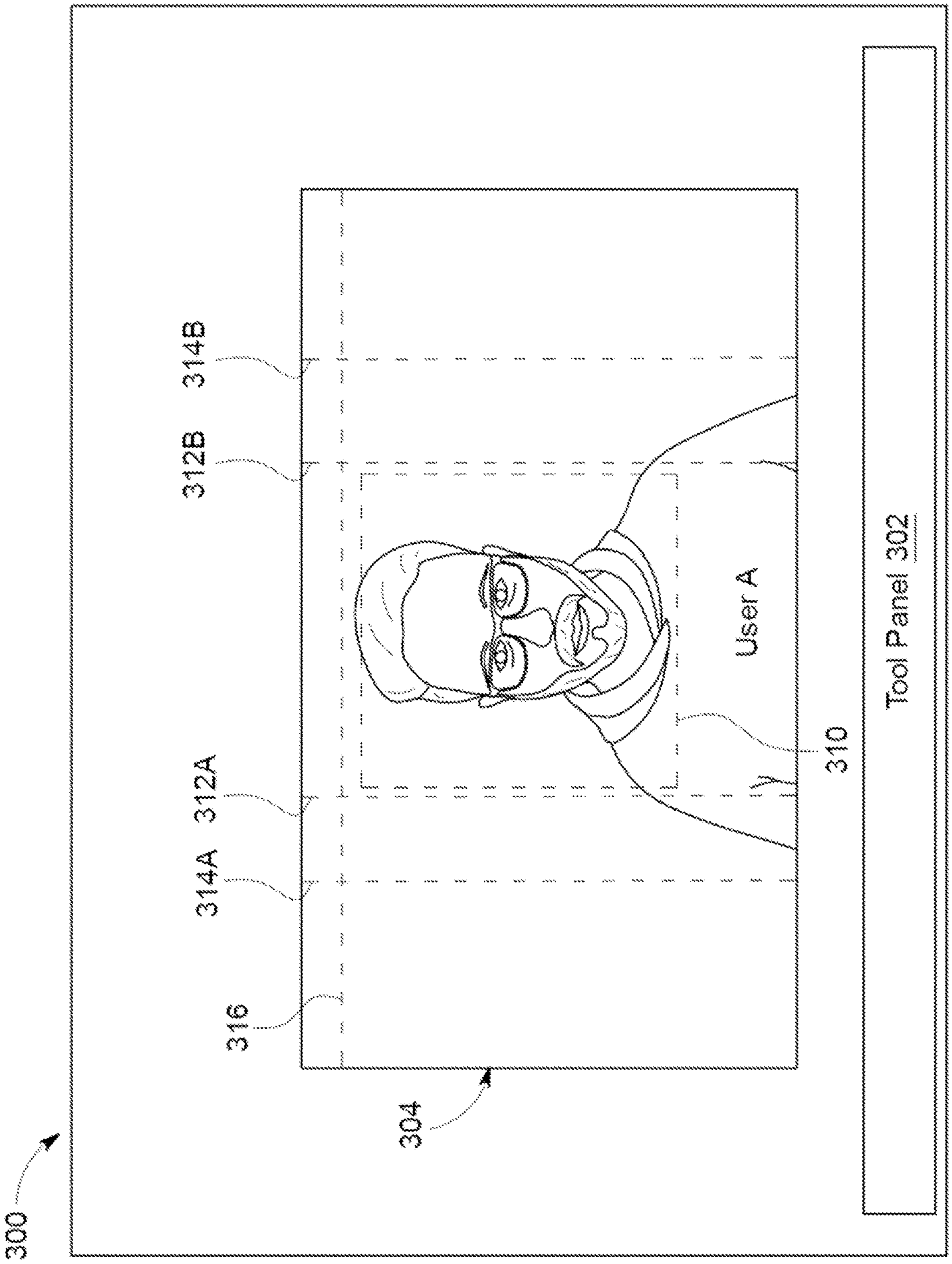
FIG. 3 illustrates an example user interface for imposing threshold lines in a set-up room, in accordance with implementations of the present disclosure.

FIG. 3 illustrates an example UI 300 for imposing threshold lines in a set-up room UI, in accordance with some implementations of the present disclosure. The UI 300 can be generated by the video conference manager 122 of FIG. 1 for presentation at a client device (e.g., client devices 102A-102N and/or 104). Accordingly, the UI 300 can be generated by one or more processing devices of the server 130 of FIG. 1. As illustrated, the video conference manager 122 can provide the UI 300 to enable user A to prepare prior to joining the video conference. In some implementations, user A can prepare using the tool panel 302, which can include button to select desired audio feature, video features, etc. In some implementations, tool panel 302 can include a button to enable/disable implementations of the present disclosure, such as, for example, generating a best-frame position and/or enabling deviation alerts during the video conference.

UI 300 can include region 304 which displays a visual item corresponding to video data captured and/or streamed by a client device used by user A. Frame 310 can indicate the location of the best-frame position. Threshold lines 312A, 312B, 314A, 314B, and 316 can be imposed on region 304. During the video conference, responsive to the position of user A crossing one or more threshold lines, a deviation alert can be triggered. In some implementations, user A can see or adjust the threshold lines. In other implementations, the threshold line can be preset and/or invisible to the user.

In some implementations, certain threshold lines can trigger different deviation alerts. In one illustrative example, the user's position crossing threshold line 312A can trigger a visual cue (e.g., a color overlay) on the left side of UI 300 and/or region 304 and crossing threshold line 312B can trigger a visual cue on the right side of UI 300 and/or region 304. Crossing threshold line 314A can trigger a more intense visual cue (e.g., a brighter color overlay) on the left side of UI 300 and/or region 304 and crossing threshold line 314B can trigger a more intense visual cue on the right side of UI 300 and/or region 304. In another example, the user's position crossing threshold lines 312A or 312B can trigger a visual cue while crossing threshold lines 314A or 314B can trigger an audible signal. Crossing threshold line 316 can, for example, trigger a visual cue on the upper side of UI 300 and/or region 304.

Figure 4:
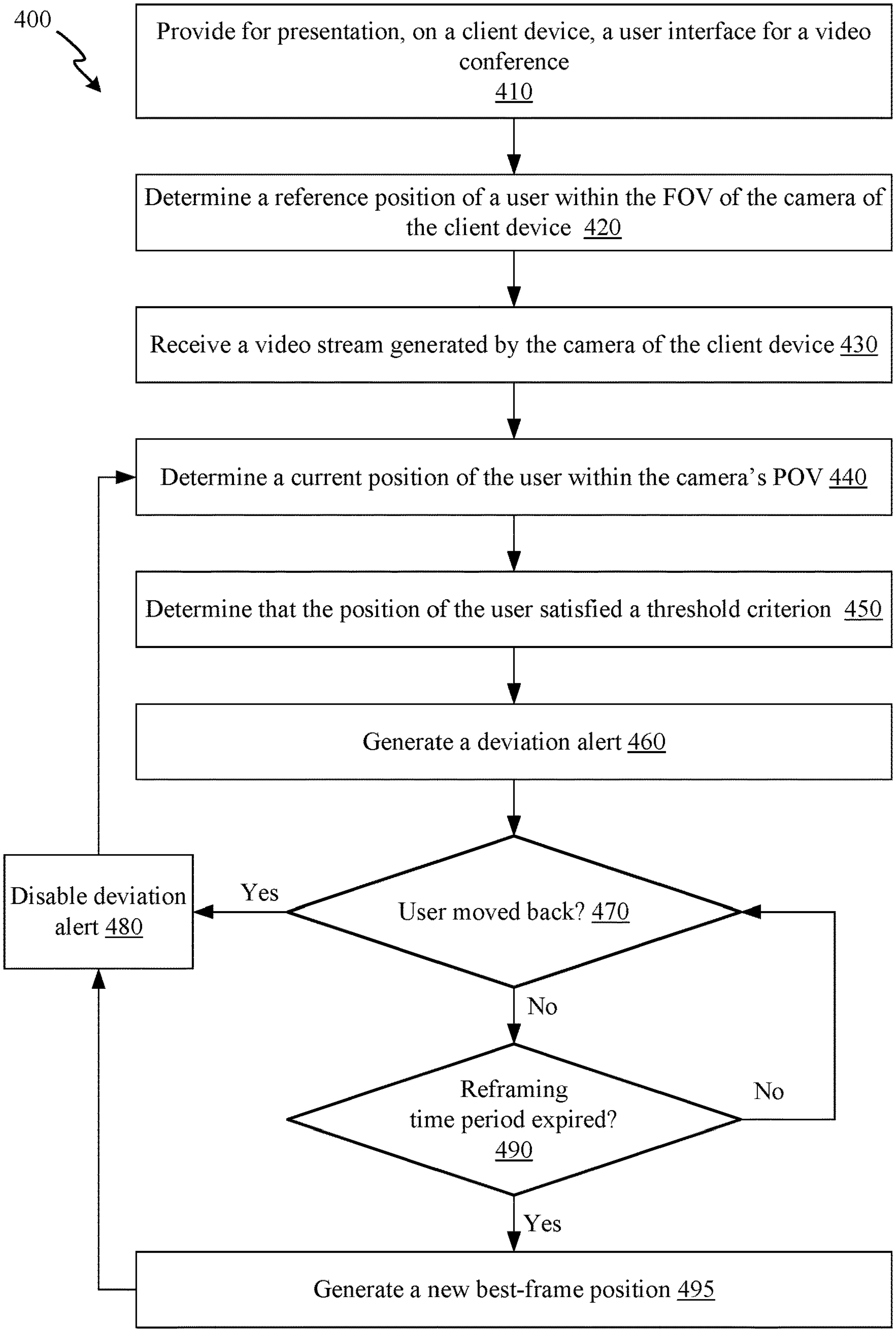
FIG. 4 depicts a flow diagram of a method for performing deviation detection during a video conference, in accordance with implementations of the present disclosure.

FIG. 4 depicts a flow diagram of a method 400 for performing deviation detection during a video conference, in accordance with implementations of the present disclosure. Method 400 can be performed by processing logic that can include hardware (circuitry, dedicated logic, etc.), software (e.g., instructions run on a processing device), or a combination thereof. In one implementation, some or all the operations of method 400 can be performed by one or more components of system 100 of FIG. 1 (e.g., client device 102A-102N, video conference platform 120, and/or server 130).

At operation 410, processing logic provides for presentation, on a client device, a user interface (e.g., user interface 108A) for a video conference. In some implementations, the user interface includes a set of regions to display a set of visual items, where each visual item corresponds to one of a set of video streams from a set of client devices of a set of participants to the video conference. In some implementations, a video stream can correspond to a series of images captured by a camera of a client device and subsequently encoded for transmission over a network in accordance with, for example, the H.264 standard.

At operation 420, the processing logic determines a reference position of a user within the FOV of the camera of the client device. The user can be one of the participants of the video conference. The reference position can be the best-frame position determined as discussed herein (for example, as discussed with respect to operation 230 of FIG. 2).

At operation 430, processing logic receives a video stream generated by the camera of the client device. The video stream can include a set of captured images of the user.

At operation 440, processing logic determines a current position of the user within the camera's POV. For example, the processing logic can identify the position of the user in one or more of the captured images obtained from the videostream. In some embodiments, the processing logic can identify the current position of the user using any combination of the software-based and hardware-based methods, such as, for example, motion tracking software, image recognition software, a machine-learning model trained to track objects or people, infrared techniques, ultrasound techniques, etc.

At operation 450, processing logic determines that the current position of the user satisfies a threshold criterion. For example, the threshold criterion is satisfied if it is determined that the user (or a portion of the user) crossed a threshold line, moved outside of the reference position, moved outside of the reference position by a certain offset percentage, moved outside of the reference position by a certain pixel amount, etc.

At operation 460, processing logic generates a deviation alert. In some implementations, generating the deviation alerts involves incorporating a visual cue to a view of the user rendered on the client device, wherein the visual cue suggests a corrective body movement to be performed by the user. The view of the user rendered on the client device refers to a presentation that is only visible to the user and not the other participants of the video conference. This can be achieved by, for example, adding the visual cue to the video stream generated by the camera associated with the user's client device, and providing such modified video stream to the user's client device, while providing a respective unmodified video stream generated by the camera associated with the user's client device to the client devices of the other participants. In some implementations, generating the deviation alerts involves incorporating an audible signal representing an alert to the audio stream reproduced by the user's client device, wherein the audible signal suggests a corrective body movement to be performed by the user. The audio stream with the incorporated audio signal is then provided to the user's client device, while the client devices of other participants are provided with a respective unmodified audio stream reproduced by the user's client device.

In some implementations, the deviation alert can be triggered on the side (e.g., top side, bottom side, left side, right side, top right side, top left side, etc.) of the UI reflecting the position of the user. In some implementations, the deviation alert can reflect the significance of the deviation (e.g., whether the user crossed threshold line 312A or 314A, whether the user moved outside the reference position by 5% the width of the camera view (triggering one type of deviation alert) or moved outside the reference position by 10% the width of the camera view (triggering a second type of deviation alert)). The deviation alert can be a visual cue, an audible alert, etc.

Figure 5A:
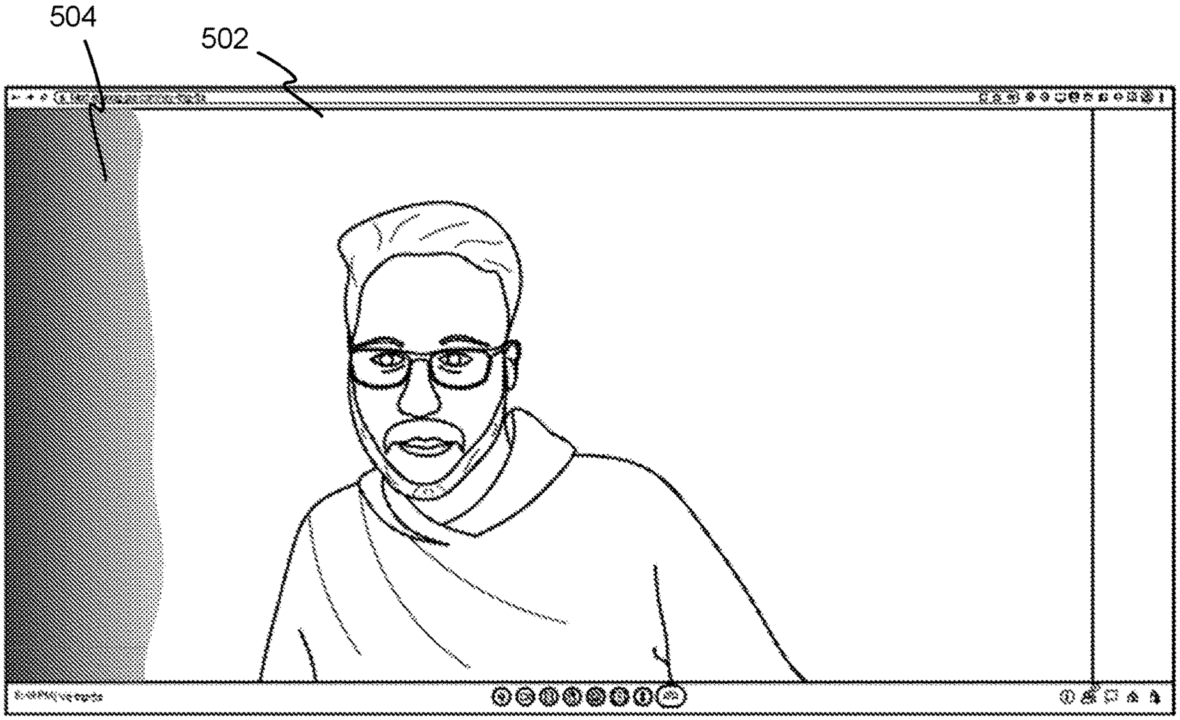
FIGS. 5A-5B illustrate example user interfaces generating a deviation alert, in accordance with implementations of the present disclosure.
Figure 5B:
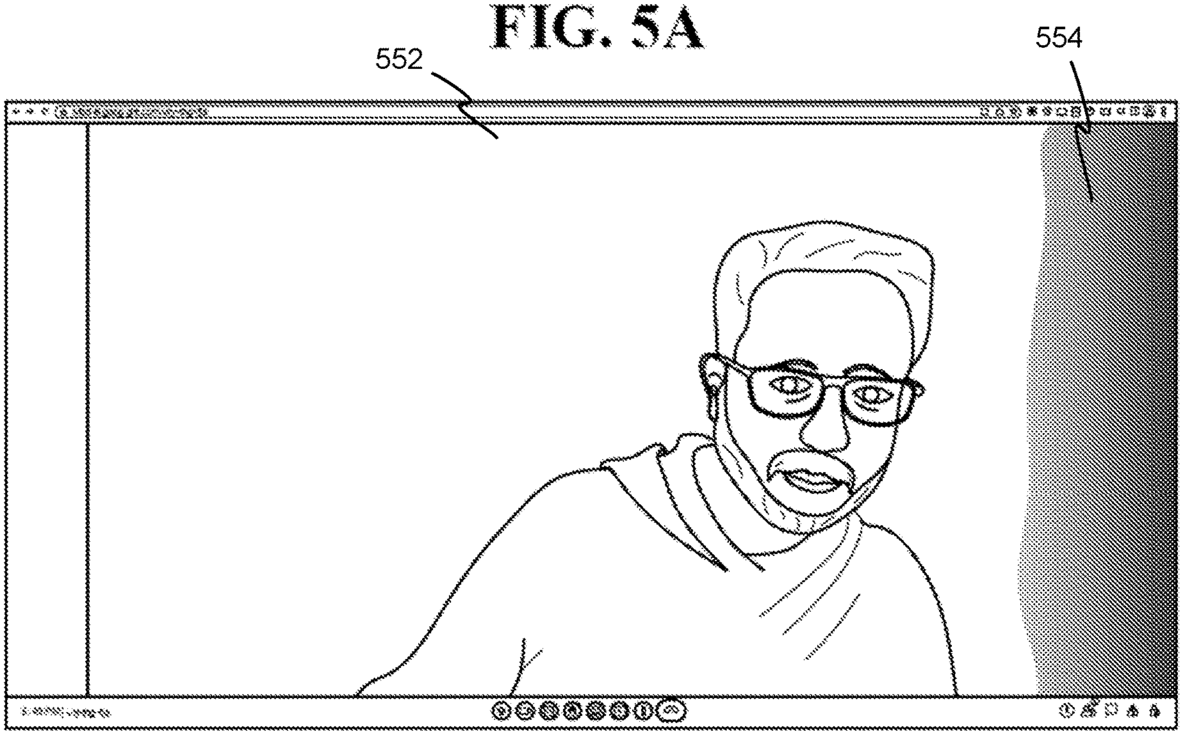
Figure 6:
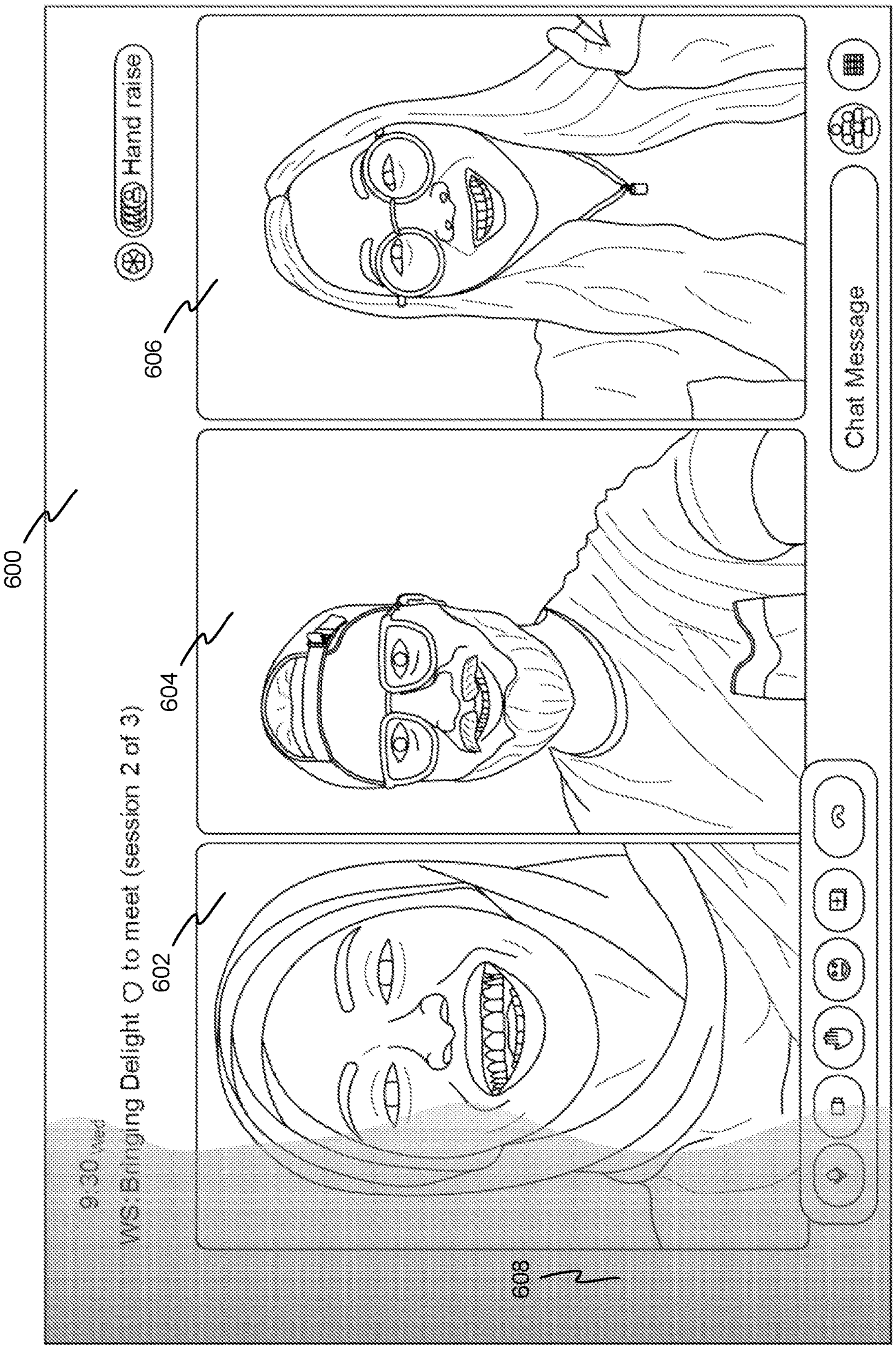
FIG. 6 illustrates another example user interface generating a deviation alert, in accordance with implementations of the present disclosure.

FIG. 5A-B illustrate example user interfaces generating a deviation alert, in accordance with some implementations. In particular, FIG. 5A shows UI region 502 including a deviation alert 504 in the form of a visual overlay (e.g., in particular color) on the left side of the UI. The deviation alert is triggered in response to the user moving outside the reference position on the left side. FIG. 5B shows UI region 552 including a deviation alert 554 in the form of an overlay (e.g, in particular color) on the right side of the UI. The deviation alert is triggered in response to the user moving outside the reference position on the right side. FIG. 6 illustrates another example user interface generating a deviation alert, in accordance with some implementations. In particular, FIG. 6 shows a UI 600 displaying three UI regions 602, 604 and 606 each presenting a video stream from a client device of one of multiple participants of a video conference. A deviation alert 608 in the form of an overlay (e.g., in a particular color) is triggered on the left side of the UI. The deviation alert is triggered in response to the user (not shown) moving outside the reference position on the left side.

Returning to FIG. 4, at operation 470, processing logic determines whether the user moved back within the reference position. Responsive to the user moving back to the reference position, the processing logic can proceed to operation 480, and disable the deviation alert. The processing logic can then proceed to operation 440 and determine a new current position of the user. Alternatively, responsive to the user position continuing to satisfy the threshold criterion, the processing logic proceeds to operation 490.

At operation 490, processing logic determines whether a reframing time period expired. The reframing time can reflect whether to generate a new reference position. The reframing time can be set by firmware, an operator of the video conference platform, by the user (e.g., using tool panel 302), etc. Responsive to the expiration of the reframing time period, the processing logic can proceed to operation 495, and generate a new best-frame position (e.g., as described above in operation 230). The processing logic then proceeds to operation 480 to disable the deviation alert. Responsive to time remaining on the reframing time period, the processing logic can proceed to operation 470 to determine whether the user moved back within the reference position.

Figure 7:
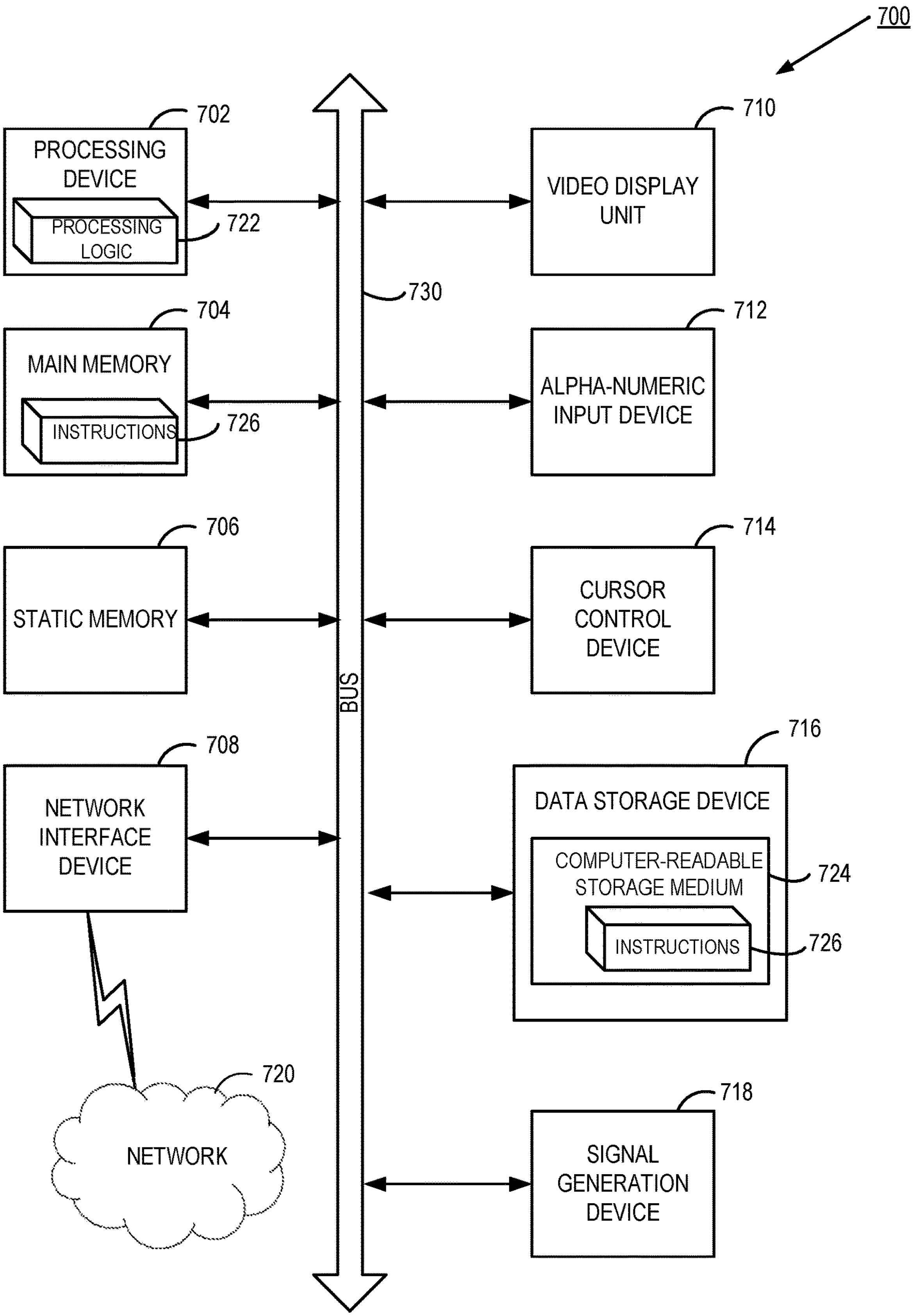
FIG. 7 is a block diagram illustrating an exemplary computer system, in accordance with implementations of the present disclosure.

FIG. 7 is a block diagram illustrating an exemplary computer system, in accordance with implementations of the present disclosure. The computer system 700 can be the server 130 or client devices 102A-N in FIG. 1. The machine can operate in the capacity of a server or an endpoint machine, in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 716, which communicate with each other via a bus 730.

Processing device 702 represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. Processing device 702 is configured to execute processing logic 722 (e.g., for determining a best-frame position and generating deviation alerts) for performing the operations discussed herein.

The computer system 700 can further include a network interface device 708. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 718 (e.g., a speaker).

The data storage device 716 can include a non-transitory machine-readable storage medium 724 (also computer-readable storage medium) on which is stored one or more sets of instructions 726 (e.g., for determining a best-frame position and generating deviation alerts) embodying any one or more of the methodologies or functions described herein. The instructions can also reside, completely or at least partially, within the main memory 704 and/or within processing device 702 during execution thereof by the computer system 700, the main memory 704 and the processing device 702 also constituting machine-readable storage media. The instructions can further be transmitted or received over a network 730 via the network interface device 708.

In one implementation, the instructions 726 include instructions for determining visual items for presentation in a user interface of a video conference. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

determining a reference position of a user within a field of view (FOV) of a camera associated with a client device, wherein the user is one of a plurality of participants of a video conference;

receiving a video stream generated by the camera associated with the client device, the video stream comprising an image of the user of the client device;

determining, from the image, a current position of the user within the FOV;

responsive to determining that a value of a metric reflecting a deviation of the current position from the reference position satisfies a threshold criterion, generating an alert to the user, wherein the metric is based on a distance of one or more facial features detected in the image of the user from a vertical axis of the FOV of the camera; and responsive to detecting, while the threshold criterion remains satisfied, an expiration of a reframing time period indicative of generating a new reference position, generating the new reference position of the user associated within the FOV, wherein the new reference position replaces the reference position for subsequent deviation detection.

2. The method of claim 1, wherein generating the alert further comprises:

incorporating a visual cue to a view of the user rendered on the client device, wherein the visual cue suggests a corrective body movement to be performed by the user.

3. The method of claim 2, wherein the visual cue comprises a visual overlay, over a user interface associated with the video conference, on a side towards which the user is deviating from the reference position.

4. The method of claim 1, wherein the metric reflecting the deviation of the current position from the reference position is based on a distance of one or more facial features detected within the image of the user from a vertical axis of the FOV of the camera.

5. The method of claim 1, further comprising:

responsive to determining that the threshold criterion is no longer satisfied, disabling the alert.

6. The method of claim 1, further comprising:

determining, from a new image, an updated position of the user within the FOV; and responsive to determining that a new value of the metric reflecting a deviation of the updated position from the reference position satisfies another threshold criterion, increasing an intensity of the alert to the user.

7. A system comprising:

a memory device; and a processing device coupled to the memory device, the processing device to perform operations comprising:

determining a reference position of a user within a field of view (FOV) of a camera associated with a client device, wherein the user is one of a plurality of participants of a video conference;

receiving a video stream generated by the camera associated with the client device, the video stream comprising an image of the user of the client device;

determining, from the image, a current position of the user within the FOV;

responsive to determining that a value of a metric reflecting a deviation of the current position from the reference position satisfies a threshold criterion, generating an alert to the user, wherein the metric is based on a distance of one or more facial features detected in the image of the user from a vertical axis of the FOV of the camera; and responsive to detecting, while the threshold criterion remains satisfied, an expiration of a reframing time period indicative of generating a new reference position, generating the new reference position of the user associated within the FOV, wherein the new reference position replaces the reference position for subsequent deviation detection.

8. The system of claim 7, wherein generating the alert further comprises:

incorporating a visual cue to a view of the user rendered on the client device, wherein the visual cue suggests a corrective body movement to be performed by the user.

9. The system of claim 7, wherein generating the alert further comprises:

incorporating an audible signal to an audio stream reproduced by the client device, wherein the audible signal suggests a corrective body movement to be performed by the user.

10. The system of claim 8, wherein the visual cue comprises a visual overlay, over a user interface associated with the video conference, on a side towards which the user is deviating from the reference position.

11. The system of claim 7, wherein the operations further comprise:

responsive to determining that the threshold criterion is no longer satisfied, disabling the alert.

12. The system of claim 7, wherein the operations further comprise:

determining, from a new image, an updated position of the user within the FOV; and responsive to determining that a new value of the metric reflecting a deviation of the updated position from the reference position satisfies another threshold criterion, increasing an intensity of the alert to the user.

13. A non-transitory computer readable storage medium comprising instructions for a server that, when executed by a processing device, cause the processing device to perform operations comprising:

determining a reference position of a user within a field of view (FOV) of a camera associated with a client device, wherein the user is one of a plurality of participants of a video conference;

receiving a video stream generated by the camera associated with the client device, the video stream comprising an image of the user of the client device;

determining, from the image, a current position of the user within the FOV;

responsive to determining that a value of a metric reflecting a deviation of the current position from the reference position satisfies a threshold criterion, generating an alert to the user, wherein the metric is based on a distance of one or more facial features detected in the image of the user from a vertical axis of the FOV of the camera; and responsive to detecting, while the threshold criterion remains satisfied, an expiration of a reframing time period indicative of generating a new reference position, generating the new reference position of the user associated within the FOV, wherein the new reference position replaces the reference position for subsequent deviation detection.

14. The non-transitory computer readable storage medium of claim 13, wherein generating the alert further comprises:

incorporating a visual cue to a view of the user rendered on the client device, wherein the visual cue suggests a corrective body movement to be performed by the user.

15. The non-transitory computer readable storage medium of claim 13, wherein generating the alert further comprises:

incorporating an audible signal to an audio stream reproduced by the client device, wherein the audible signal suggests a corrective body movement to be performed by the user.

* * * * *